(12) United States Patent
Higashimura et al.

(10) Patent No.: US 7,291,692 B2
(45) Date of Patent: Nov. 6, 2007

(54) POLYARYLENE OXIDE AND METHOD OF PRODUCING THE SAME

(75) Inventors: Hideyuki Higashimura, Tsukuba (JP); Yuji Yoshida, Tokyo (JP); Daisuke Fukushima, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/946,294

(22) Filed: Sep. 22, 2004

(65) Prior Publication Data
US 2005/0096452 A1    May 5, 2005

(30) Foreign Application Priority Data
Sep. 25, 2003  (JP)  ............................. 2003-333139

(51) Int. Cl.
*C08G 2/00*    (2006.01)

(52) U.S. Cl. .................... 528/86; 528/480; 528/491

(58) Field of Classification Search .................. 528/86, 528/480, 491
See application file for complete search history.

(56) References Cited

U.S. PATENT DOCUMENTS 4,806,601 A    2/1989    Percec

FOREIGN PATENT DOCUMENTS

JP    5-8932 B2    2/1993
JP    2000-63499 A    2/2000

OTHER PUBLICATIONS

Yang et al., Pure Appl. Chem., vol. A31, No. 2, pp. 155-169, (1994).
Yashima et al., Macromolecules, vol. 28, No. 12, pp. 4184-4193, (1995).
Jayaraman et al., Polymer Chemistry, vol. 33, No. 10, pp. 1551-1563, (1995).

*Primary Examiner*—Duc Truong
(74) *Attorney, Agent, or Firm*—Birch, Stewart, Kolasch & Birch, LLP

(57) ABSTRACT

A method of producing a polyarylene oxide comprising a step of oxidative polymerization of a monomer represented by the general formula (1) in an organic solvent in the presence of a transition metal compound,

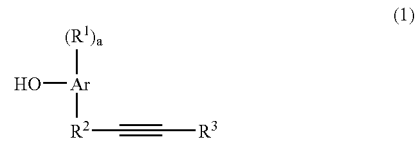

(1)

wherein, Ar represents a benzene ring or a naphthalene ring, $R^1$ represents a hydrocarbon group optionally substituted, a hydrocarbonoxy group optionally substituted, or a halogen atom; a represents an integer of 0 to 5, and when a is 2 or more, $R^1$s may be the same or different, adjacent $R^1$s may mutually bond to form a ring; $R^2$ represents a single bond or an arylene group; $R^3$ represents a hydrocarbon group optionally substituted or a trialkylsilyl group.

3 Claims, 1 Drawing Sheet

POLYARYLENE OXIDE AND METHOD OF PRODUCING THE SAME

This Nonprovisional application claims priority under 35 U.S.C. § 119(a) on Patent Application No(s). 2003-333139 filed in Japan on Sep. 25, 2003, the entire contents of which are hereby incorporated by reference.

BACKGROUND OF THE INVENTION

1. Field of the Invention

The present invention relates to a polyarylene oxide and a method of producing the same.

2. Description of the Related Art

Polyarylene oxides are widely used in applications such as engineering plastic materials, coating film materials, insulation materials and the like because of excellent performances such strength, insulation property, dielectric property and the like.

As a method of producing a polyarylene oxide having such excellent performances, there is known, for example, a method in which 3-ethynylphenol is oxidatively polymerized in a mixed solvent of organic solvent/water using an enzymatic catalyst such as laccases and the like (JP-A No. 2000-63499).

However, the resulting polyphenylene oxide has a ratio of hydroxyphenylene to oxyphenylene of 40/60 and a hydroxyl equivalent of 290, namely, its thermal stability is not admitted as sufficient.

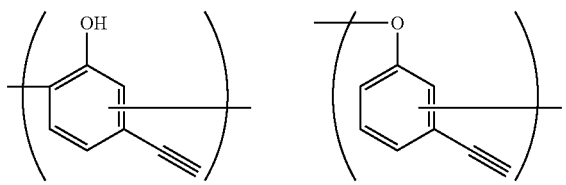

SUMMARY OF THE INVENTION

The present inventors have intensively studied to find a method of producing a polyarylene oxide capable of solving the problem as described above and resultantly found that a polyarylene oxide excellent in thermal stability is obtained by oxidative polymerization of a monomer such as an ethynylphenol derivative and the like in the presence of a transition metal compound, leading to completion of the invention.

That is, the present invention relates to:

[1] A method of producing a polyarylene oxide comprising oxidative polymerization of a monomer shown by formula (1) in an organic solvent in the presence of a transition metal compound,

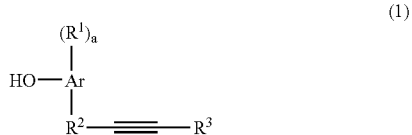

wherein, Ar represents a benzene ring or a naphthalene ring, $R^1$ represents a hydrocarbon group optionally substituted, a hydrocarbonoxy group optionally substituted, or a halogen atom; a represents an integer of 0 to 5, and when a is 2 or more, $R^1$s may be the same or different, adjacent $R^1$s may mutually bond to form a ring; $R^2$ represents a single bond or an arylene group; $R^3$ represents a hydrocarbon group optionally substituted or a trialkylsilyl group.

[2] A polyarylene oxide obtained according to the method of [1], containing a repeating unit shown by formula (2),

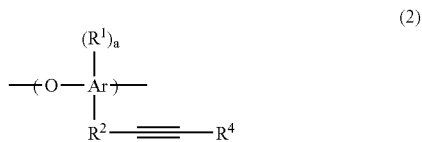

wherein, Ar, $R^1$, $R^2$ and a have the same meanings as above, and $R^4$ represents hydrogen atom, a hydrocarbon group optionally substituted, or a trialkylsilyl group, and said polyarylene oxide has a number-average molecular weight of 500 or more and a hydroxyl equivalent of 500 or more.

DETAILED DESCRIPTION OF THE INVENTION

Figure 1:
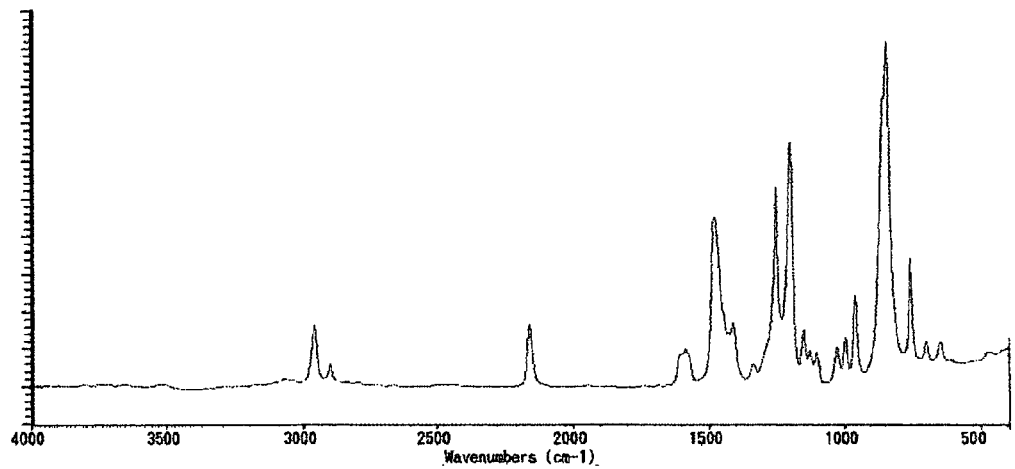
FIG. 1 is a view showing an IR chart of a polymer obtained in Example 1.

The monomer used as a raw material for a polyarylene oxide in the present invention is represented by the above formula (1).

Ar in formula (1) represents a benzene ring or a naphthalene ring, and preferable is a benzene ring. It is defined that hydrogen atoms are bonded to carbon atoms having no substituents in a benzene ring or a naphthalene ring.

$R^1$ in formula (1) represents a hydrocarbon group optionally substituted, a hydrocarbonoxy group optionally substituted, or a halogen atom and a represents an integer of 0 to 5. When a is 2 or more, $R^1$s may be the same or different, and adjacent $R^1$s may mutually bond to form a ring.

Examples of the hydrocarbon group of $R^1$ in formula (1) include alkyl groups having about 1 to 50 carbon atoms such as methyl group, ethyl group, propyl group, isopropyl group, butyl group, isobutyl group, t-butyl group, pentyl group, hexyl group, nonyl group, dodecyl group, pentadecyl group, octadecyl group, docosyl group and the like; cyclic saturated hydrocarbon groups having about 3 to 50 carbon atoms such as cyclopropyl group, cyclobutyl group, cyclopentyl group, cyclohexyl group, cyclononyl group, cyclododecyl group, norbornyl group, adamantyl group and the like; alkenyl groups having about 2 to 50 carbon atoms such as ethenyl group, propenyl group, 3-butenyl group, 2-butenyl group, 2-pentenyl group, 2-hexenyl group, 2-nonenyl group, 2-dodecenyl group and the like; aryl groups having about 6 to 50 carbon atoms such as phenyl group, 1-naphthyl group, 2-naphthyl group, 2-methylphenyl group, 3-methylphenyl group, 4-methylphenyl group, 4-ethylphenyl group, 4-propylphenyl group, 4-isopropylphenyl group, 4-butylphenyl group, 4-t-butylphenyl group, 4-hexylphenyl group, 4-cyclohexylphenyl group, 4-adamantylphenyl group, 4-phenylphenyl group and the like; and aralkyl groups having about 7 to 50 carbon atoms such as phenylmethyl group, 1-phenylethyl group, 2-phenylethyl group, 1-phenyl-1-propyl group, 1-phenyl-2-propyl group, 2-phenyl-2-propyl group, 1-phenyl-3-propyl group, 1-phenyl-4-butyl group, 1-phenyl-5-pentyl group, 1-phenyl-6-hexyl group and the like.

The hydrocarbon group is preferably a hydrocarbon group having 1 to 30 carbon atoms, more preferably a hydrocarbon group having 1 to 22 carbon atoms, further preferably a hydrocarbon group having 1 to 16 carbon atoms.

The hydrocarbon group may be substituted with a halogen atom, hydroxyl group, an alkyloxy group, nitro group, a trialkylsilyl group and the like, and the hydrocarbon group substituted with such atom and group is referred to as a substituted hydrocarbon group.

Here, the halogen atom includes fluorine atom, chlorine atom, bromine atom and iodine atom.

Examples of the alkyloxy group include alkyloxy groups having about 1 to 50 carbon atoms such as methyloxy group, ethyloxy group, propyloxy group, isopropyloxy group, butyloxy group, isobutyloxy group, t-butyloxy group, pentyloxy group, hexyloxy group, nonyloxy group, dodecyloxy group, pentadecyloxy group, octadecyloxy group, docosyloxy group and the like.

Examples of the alkyl group of the trialkylsilyl group include alkyl groups having about 1 to 50 carbon atoms such as methyl group, ethyl group, propyl group, isopropyl group, butyl group, isobutyl group, t-butyl group, pentyl group, hexyl group, nonyl group, dodecyl group, pentadecyl group, octadecyl group, docosyl group and the like, and three alkyl groups may be the same or different.

The atom and group substituted on the hydrocarbon group are preferably a halogen atom, hydroxyl group, and an alkyloxy group, more preferably a halogen atom and hydroxyl group, further preferably fluorine atom and hydroxyl group.

The substituted hydrocarbon group is preferably a substituted hydrocarbon group having 1 to 40 carbon atoms, more preferably 1 to 25 carbon atoms, further preferably 1 to 18 carbon atoms.

Examples of the hydrocarbonoxy group of $R^1$ in formula (1) include alkyloxy groups having about 1 to 50 carbon atoms such as methyloxy group, ethyloxy group, propyloxy group, isopropyloxy group, butyloxy group, isobutyloxy group, t-butyloxy group, pentyloxy group, hexyloxy group, nonyloxy group, dodecyloxy group, pentadecyloxy group, octadecyloxy group, docosyloxy group and the like; cyclic saturated hydrocarbonoxy groups having about 3 to 50 carbon atoms such as cyclopropyloxy group, cyclobutyloxy group, cyclopentyloxy group, cyclohexyloxy group, cyclononyloxy group, cyclododecyloxy group, norbornyloxy group, adamantyloxy group and the like; alkenyloxy groups having about 2 to 50 carbon atoms such as ethenyloxy group, propenyloxy group, butenyloxy group, pentenyloxy group, hexenyloxy group, nonenyloxy group, dodecenyloxy group and the like; alkynyloxy groups having about 2 to 50 carbon atoms such as propynyloxy group, butynyloxy group, pentynyloxy group, hexynyloxy group, nonynyloxy group, dodecynyloxy group and the like; aryloxy groups having about 6 to 50 carbon atoms such as phenyloxy group, 1-naphthyloxy group, 2-naphthyloxy group, 2-methylphenyloxy group, 3-methylphenyloxy group, 4-methylphenyloxy group, 4-ethylphenyloxy group, 4-propylphenyloxy group, 4-isopropylphenyloxy group, 4-butylphenyloxy group, 4-t-butylphenyloxy group, 4-hexylphenyloxy group, 4-cyclohexylphenyloxy group, 4-adamantylphenyloxy group, 4-phenylphenyloxy group and the like; and aralkyloxy groups having about 7 to 50 carbon atoms such as phenylmethyloxy group, 1-phenylethyloxy group, 2-phenylethyloxy group, 1-phenyl-1-propyloxy group, 1-phenyl-2-propyloxy group, 2-phenyl-2-propyloxy group, 1-phenyl-3-propyloxy group, 1-phenyl-4-butyloxy group, 1-phenyl-5-pentyloxy group, 1-phenyl-6-hexyloxy group and the like.

The hydrocarbonoxy group is preferably a hydrocarbonoxy group having 1 to 30 carbon atoms, more preferably a hydrocarbonoxy group having 1 to 22 carbon atoms, further preferably a hydrocarbonoxy group having 1 to 16 carbon atoms.

The hydrocarbonoxy group may be substituted with a halogen atom, hydroxyl group, an alkoxy group, nitro group, a trialkylsilyl group and the like, and the hydrocarbonoxy group substituted with such atom and group is referred to as a substituted hydrocarbonoxy group.

As the atom and group substituted on the hydrocarbonoxy group, the specific examples and preferred examples are the same as described above.

The substituted hydrocarbonoxy group is preferably a substituted hydrocarbonoxy group having 1 to 40 carbon atoms, more preferably a substituted hydrocarbonoxy group having 1 to 25 carbon atoms, further preferably a hydrocarbonoxy group having 1 to 18 carbon atoms.

The halogen atom of $R^1$ in formula (1) includes fluorine atom, chlorine atom, bromine atom and iodine atom, and more preferable are fluorine atom, chlorine atom and bromine atom, and further preferable are fluorine atom and chlorine atom.

In formula (1), a represents an integer of 0 to 5. When a is 2 or more, $R^1$s may be the same or different, and when two $R^1$s bond to two adjacent carbon atoms on Ar, the $R^1$s may mutually bond to form a ring. When a ring is formed, it is preferable that two $R^1$s mutually bond to form a moiety of —(CH$_2$)$_3$—, —(CH$_2$)$_4$—, —CH=CH—CH=CH— or the like, and a ring structure including said moiety and two adjacent carbon atoms on Ar is formed.

In formula (1), a is preferably an integer of 0 to 3, more preferably an integer of 0 to 2, further preferably 0 or 1, particularly preferably 0.

In formula (1), $R^1$ is preferably an unsubstituted hydrocarbon group or an unsubstituted hydrocarbonoxy group, more preferably an unsubstituted hydrocarbon group, and from the standpoint of thermal stability, further preferable are phenyl group, naphthyl group, adamantly group, and adamantylphenyl group.

In formula (1), $R^2$ represents a single bond or a bi-functional arylene group.

Examples of the bi-functional arylene group include 1,2-phenylene group, 1,3-phenylene group, 1,4-phenylene group, 4-methyl-1,2-phenylene group, 5-methyl-1,3-phenylene group, 5-ethyl-1,3-phenylene group, 5-propyl-1,3-phenylene group, 5-isopropyl-1,3-phenylene group, 5-butyl-1,3-phenylene group, 5-t-butyl-1,3-phenylene group, 5-hexyl-1,3-phenylene group, 5-cyclohexyl-1,3-phenylene group, 5-adamantyl-1,3-phenylene group, 5-phenyl-1,3-phenylene group, 2-methyl-1,4-phenylene group, 1,2-naphthylene group, 1,3-naphthylene group, 1,4-naphthylene group, 1,5-naphthylene group, 1,6-naphthylene group, 1,7-naphthylene group, 1,8-naphthylene group, and the like.

In formula (1), $R^2$ is preferably a single bond, a phenylene group, or a naphthylene group, more preferably a single bond or a phenylene group, further preferably a single bond, 1,3-phenylene group, or 1,4-phenylene group, and particularly preferably a single bond.

In formula (1), $R^3$ represents a hydrocarbon group optionally substituted or a trialkylsilyl group.

As the hydrocarbon group of $R^3$ optionally substituted in formula (1), the specific examples and preferred examples are the same as those mentioned for $R^1$ in formula (1).

Examples of the alkyl group of the trialkylsilyl group of $R^3$ in formula (1) include alkyl groups having about 1 to 50 carbon atoms such as methyl group, ethyl group, propyl group, isopropyl group, butyl group, isobutyl group, t-butyl group, pentyl group, hexyl group, nonyl group, dodecyl group, pentadecyl group, octadecyl group, docosyl group and the like, and three alkyl groups may be the same or different. The alkyl group is preferably an alkyl group having 1 to 12 carbon atoms, more preferably an alkyl group having 1 to 6 carbon atoms, further preferably an alkyl group having 1 to 4 carbon atoms, and particularly preferably methyl group.

$R^3$ in formula (1) is preferably an aryl group, an alkyl group, an alkyl group substituted with a hydroxyl group, or a trialkylsilyl group, more preferably an aryl group, an alkyl group substituted with a hydroxyl group, or a trialkylsilyl group, further preferably a 1-hydroxyalkyl group or a trialkylsilyl group, and particularly preferably 2-hydroxyisopropyl group or trimethylsilyl group.

Examples of the monomer shown by formula (1) include 2-(trimethylsilylethynyl)phenol, 3-(trimethylsilylethynyl)phenol, 4-(trimethylsilylethynyl)phenol, 2-(trimethylsilylethynyl)-6-phenylphenol, 2-(trimethylsilylethynyl)-5-phenylphenol, 2-(trimethylsilylethynyl)-3-phenylphenol, 2-(trimethylsilylethynyl)-6-methylphenol, 2-(trimethylsilylethynyl)-6-ethylphenol, 2-(trimethylsilylethynyl)-6-propylphenol, 2-(trimethylsilylethynyl)-6-butylphenol, 2-(trimethylsilylethynyl)-6-pentylphenol, 2-(trimethylsilylethynyl)-6-hexylphenol, 2-(trimethylsilylethynyl)-6-ethylphenol, 3-(trimethylsilylethynyl)-6-phenylphenol, 3-(trimethylsilylethynyl)-6-t-butylphenol, 3-(trimethylsilylethynyl)-6-adamantylphenol, 3-(trimethylsilylethynyl)-6-fluorophenol, 6-(trimethylsilylethynyl)-3-methoxyphenol, 2-(triethylsilylethynyl)phenol, 2-(methylethynyl)phenol, 3-(methylethynyl)phenol, 2-(phenylethynyl)phenol, 3-(phenylethynyl)phenol, 2-((2-hydroxyisopropyl)ethynyl)phenol, 3-((2-hydroxyisopropyl)ethynyl)phenol, 2-(3-ethynylphenyl) phenol, 2-(4-ethynylphenyl) phenol and the like.

In oxidative polymerization of a monomer shown by formula (1), a monomer shown by the following formula (3) may be co-polymerized.

(3)

In the formula, Ar' represents a benzene ring or naphthalene ring, and preferable is a benzene ring. It is defined that a hydrogen atom is bonded to a carbon atom carrying no substituent in a benzene ring or naphthalene ring.

$R^5$ represents a hydrocarbon group optionally substituted, a hydrocarbonoxy group optionally substituted or a halogen atom and preferable are a hydrocarbon group optionally substituted and a hydrocarbonoxy group optionally substituted.

b represents an integer of 0 to 6. When b is 2 or more, $R^5$s may be the same or different, and adjacent $R^5$s may mutually bond to form a ring. When a ring is formed, it is preferable that two $R^1$s mutually bond to form a moiety of —(CH$_2$)$_3$—, —(CH$_2$)$_4$—, —CH=CH—CH=CH— or the like, and a ring structure including said moiety and two adjacent carbon atoms on Ar is formed.

b represents preferably an integer of 0 to 3, more preferably an integer of 0 to 2, further preferably 0 or 1.

As the hydrocarbon group, the same compounds as described above are mentioned. The hydrocarbon group is preferably a hydrocarbon group having 1 to 30 carbon atoms, more preferably a hydrocarbon group having 1 to 22 carbon atoms, further preferably a hydrocarbon group having 1 to 16 carbon atoms.

The above-mentioned hydrocarbonoxy group may be substituted with a halogen atom, hydroxyl group, alkoxy group, nitro group, trialkylsilyl group and the like.

Here, as the halogen atom, alkoxy group and trialkylsilyl group, the same compounds as described above are mentioned.

The above-mentioned substituted hydrocarbon group is preferably a substituted hydrocarbon group having 1 to 40 carbon atoms, more preferably a substituted hydrocarbon group having 1 to 25 carbon atoms, further preferably a substituted hydrocarbon group having 1 to 18 carbon atoms.

As the hydrocarbonoxy group, the same compounds as described above are mentioned. The hydrocarbonoxy group is preferably a hydrocarbonoxy group having 1 to 30 carbon atoms, more preferably a hydrocarbonoxy group having 1 to 22 carbon atoms, further preferably a hydrocarbonoxy group having 1 to 16 carbon atoms.

The above-mentioned hydrocarbonoxy group may be substituted with a halogen atom, hydroxyl group, alkoxy group, nitro group, trialkylsilyl group and the like. As the halogen atom, alkoxy group and trialkylsilyl group, the same compounds as described above are mentioned.

The above-mentioned substituted hydrocarbonoxy group is preferably a substituted hydrocarbonoxy group having 1 to 40 carbon atoms, more preferably a substituted hydrocarbonoxy group having 1 to 25 carbon atoms, further preferably a substituted hydrocarbonoxy group having 1 to 18 carbon atoms.

In the general formula (3), $R^5$ is preferably an unsubstituted hydrocarbon group or an unsubstituted hydrocarbonoxy group, more preferably an unsubstituted hydrocarbon group, and from the standpoint of thermal stability, further preferable are a phenyl group, naphthyl group, adamantly group and adamantylphenyl group.

Examples of the monomer shown by formula (3) include phenol, 2-methylphenol, 3-methylphenol, 2,3-dimethylphenol, 2,5-dimethylphenol, 2,6-dimethylphenol, 2,3,5-trimethylphenol, 2-ethylphenol, 2-propylphenol, 2-isopropylphenol, 2-butylphenol, 2-isobutylphenol, 2-t-butylphenol, 2-pentylphenol, 2-hexylphenol, 2-nonylphenol, 2-dodecylphenol, 2-pentadecylphenol, 2-octadecylphenol, 2-docosylphenol, 2-cyclopentylphenol, 2-cyclohexylphenol, 2-adamantylphenyl, 2-ethenylphenol, 2-prope-1-nylphenol, 2-prope-2-nylphenol, 2-prope-3-nylphenol, 2-ethynylphenol, 2-phenylphenol, 2-(1-naphthyl)phenol, 2-(2-naphthyl) phenol, 2-(4-t-butylphenyl)phenol, 4-cyclohexylphenyl) phenol, 2-(4-adamantylphenyl)phenol, 2-(4-phenylphenyl) phenol, 2-phenylmethylphenol, 2-(2-phenylethyl)phenol, 2-trimethylsilylethenylphenol, 2-methoxyphenol, 2-phenoxyphenol, 4-phenoxyphenol, 2-fluorophenol and the like.

When a monomer shown by formula (3) is co-polymerized, the addition amount thereof is not particularly restricted. The addition amount of a monomer shown by formula (3) is preferably 0.001 to 1000, more preferably 0.01 to 100, further preferably 0.1 to 50, as a molar ratio to a monomer shown by formula (1).

The monomer is oxidatively polymerized in an organic solvent in the presence of a transition metal compound.

In this procedure, the transition metal compound acts as an oxidizer or catalyst. Here, the transition metal compound means a compound of an element of groups III to XII of the periodic table (IUPAC Inorganic Chemistry Nomenclature, Revision 1989), and does not include an organism enzyme such as an enzyme containing the compound, and the like. Examples of the transition metal in the transition metal compound include, but not limited to, scandium, titanium, vanadium, chromium, manganese, iron, cobalt, nickel, copper, yttrium, zirconium, niobium, molybdenum, technetium, ruthenium, rhodium, palladium, silver, cerium, platinum, gold and the like.

When a transition metal compound is allowed to act as an oxidizer for the oxidative polymerization of the monomer, the transition metal compound need no abilities other than an ability of oxidizing the monomer. Usually, the standard oxidative reduction potential (25° C.) is advantageously 0.1 V or more, preferably 0.2 V or more, more preferably 0.5 V or more, further preferably 1.0 V or more.

Specifically listed are transition metal compounds having a standard electrode potential (25° C.) in an aqueous solution described in Chemical Society of Japan, "Revised 4-th edition, Kagaku Binran, Kisohen II", p. 465 to 468, Table 12 and 40 of 0.1 V or more, and ions thereof. Specific examples thereof include transition metal compounds composed of a transition metal ion such as penta-valent vanadium ion, tri-valent manganese ion, tri-valent iron ion, tri-valent cobalt ion, di-valent copper ion, mono-valent silver ion, mono-valent gold ion, tetra-valent cerium ion and the like, a counter anion such as fluoride ion, chloride ion, bromide ion, iodide ion, sulfate ion, nitrate ion, carbonate ion, perchlorate ion, tetrafluoroborate ion, hexafluorophosphate ion, methanesulfonate ion, trifluoromethanesulfonate ion, toluenesulfonate ion, acetate ion, trifluoroacetate ion, propionate ion, benzoate ion, hydroxide ion, oxide ion, methoxide ion, ethoxide ion and the like, and a counter cation such as an alkali metal ion, an alkaline earth metal ion, ammonium ion and the like. When the transition metal compound is allowed to act as an oxidizer, the amount thereof is not particularly restricted, and preferably 0.5 to 3 mol, more preferably 0.6 to 2 mol, further preferably 0.7 to 1.5 mol, per mol of a monomer.

When a transition metal compound is used as a catalyst for oxidative polymerization of the monomer, a usual oxidizer may also be used together. As the catalyst, transition metal complex catalysts composed of transition metal atoms and ligand compounds are desirable.

The transition metal atom of the transition metal complex catalyst is a transition metal atom in groups IV to XI of the periodic table. It is preferably a transition metal atom of first transition element series, more preferable vanadium, manganese, iron, cobalt, nickel or copper, further preferably manganese, iron or copper.

The valency of the transition metal atom can be appropriately selected from those usually present in the natural field, and it is, for example, in the case of vanadium, 3 to 5, in the case of manganese, 2 to 4, in the case of iron, 2 to 4, in the case of cobalt, 2 or 3, in the case of nickel, 2, and in the case of copper, 1 or 2.

Specific examples of the ligand compound of the transition metal complex catalyst include monodentate ligand compounds such as pyridine, quinoline, imidazole, benzimidazole, oxazole, benzoxazole, thiazole, benzthiazole and derivatives thereof and the like; bidentate ligand compounds such as ethylenediamine, 1,3-propanediamine, 1,2-cyclohexanediamine, 2,2'-bipyridyl, 2,3-butanedioxime, 2,3-bis(N-methylmino)-butane, acetylacetone, acetylacetaldehyde, benzoylacetone, salicylaldehyde, acetoacetic acid, salicylic acid and derivatives thereof and the like; tridentate ligand compounds such as diethylenetriamine, bis(2-pyridylmethyl)amine, bis(2-pyridylethyl)amine, bis(2-imidazolylmethyl)amine, bis(2-oxazolylmethyl)amine, bis(2-thiazolylmethyl)amine, N-(2-pyridylmethylidene)-N-(2-pyridylmethyl)amine, 2,2':6',2''-terpyridine, 3-(2-pyridylmethylimino)-2-butanoneoxime, tris(2-pyridyl) methane, tris(2-imidazolyl)methane, tris(1-pyrazolyl) methane, tris(1-pyrazolyl) phosphate, tris(1-pyrazolyl) borate, 1,4,7-triazacyclononane and derivatives thereof and the like; tetradentate ligand compounds such as tris(2-pyridylmethyl)amine, tris(2-imidazolylmethyl)amine, tris (1-pyrazolylmethyl)amine, nitrilotriacetic acid, nitrilotriethanol, tris(2-pyridyl-2-ethyl)amine, triethylenetetramine, N,N'-bis(2-hydroxyethyl)ethylenediamine, N,N'-ethylenediaminediacetic acid, N,N'-bis(2-pyridylmethyl)ethylenediamine, N,N'-disalicylideneethylenediamine, N-2-hydroxyethyl-N'-salicylideneethylenediamine, N-2-aminoethyl-N'-salicylideneethylenediamine, N-2-pyridylmethyl-N'-salicylideneethylenediamine, 1,4,8,11-tetraazacyclotetradecane and derivatives thereof and the like; and pentadentate ligand compounds such as tetraethylenepentamine, N,N''-bis(2-hydroxyethyl)diethylenetriamine, N,N''-diethylenetriaminediacetic acid, N,N''-bis(2-pyridylmethyl)diethylenetriamine, N,N''-bis(2-imidazolylmethyl)diethylenetriamine, N,N''-bis(salicylidene)diethylenetriamine and derivatives thereof and the like, and those obtained by removing one or more protons from these compounds may also be used. Preferable are monodentate to tetradentate ligand compounds, more preferable are monodentate to tridentate ligand compounds, further preferable is monodentate or tridentate ligand compound.

The molar ratio of the ligand compound to a transition metal atom of a transition metal complex catalyst is preferably 0.01 to 1000, more preferably 0.1 to 100, further preferably 0.5 to 2, particularly preferably 1.

The structure of portions other than a transition metal atom and a ligand compound in a transition metal complex catalyst is not particularly restricted providing it does not deactivate catalytic ability.

To the transition metal complex of the present invention, a counter ion keeping electric neutrality may be added.

As this counter anion, conjugated bases of Broensted acids are usually used, and specific examples thereof include fluoride ion, chloride ion, bromide ion, iodide ion, sulfate ion, nitrate ion, carbonate ion, perchlorate ion, tetrafluoroborate ion, hexafluorophosphate ion, methanesulfonate ion, trifluoromethanesulfonate ion, toluenesulfonate ion, acetate ion, trifluoroacetate ion, propionate ion, benzoate ion, hydroxide ion, oxide ion, methoxide ion, ethoxide ion and the like. As the counter cation, cations of alkali metals and alkaline earth metals and the like can be appropriately used.

As the transition metal complex catalyst, complexes previously synthesized can be used, however, a complex may be formed in the reaction system.

Regarding the amount of the transition metal complex catalyst, the amount of a transition metal atom based on a monomer is preferably 0.001 to 50 mol %, more preferably 0.01 to 20 mol %, further preferably 0.02 to 10 mol %.

As the oxidizer used, oxygen or peroxide is preferable. Oxygen may be a mixture with an inert gas, or air. As the peroxide, for example, hydrogen peroxide, t-butyl hydroperoxide, di-t-butyl peroxide, cumene hydroperoxide, dicumyl peroxide, peracetic acid, perbenzoic acid and the like are listed. The preferable oxidizer is oxygen or hydrogen peroxide. The amount of the oxidizer is not particularly restricted, and when oxygen is used, it is usually large excess by 0.5 equivalent or more based on a monomer, and when a peroxide is used, it is usually 0.5 to 3 equivalent based on a monomer.

The oxidative polymerization of a monomer is conducted in an organic solvent. It is preferable that water other than water generally contained in an organic solvent and water generated by oxidative polymerization is not added to the reaction system of oxidative polymerization. "Water generally contained in an organic solvent" means water present in a commercially available organic solvent, and specifically, water in an amount of about 0.01 to 1 wt %.

Examples of the organic solvent include aromatic hydrocarbons such as benzene, toluene, xylene and the like; linear or cyclic aliphatic hydrocarbons such as heptane, cyclohexane and the like; halogenated hydrocarbons such as chlorobenzene, dichlorobenzene, dichloromethane and the like; nitriles such as acetonitrile, benzonitrile and the like; alcohols such as methanol, ethanol, n-propyl alcohol, iso-propyl alcohol and the like; ethers such as dioxane, tetrahydrofuran, ethylene glycol dimethyl ether and the like; amides such as N,N-dimethylformamide, N-methylpyrrolidone and the like; and nitro compounds such as nitromethane, nitrobenzene and the like. As the organic solvent, preferable are aromatic hydrocarbons, linear and cyclic aliphatic hydrocarbons, halogenated hydrocarbons, nitriles, ethers and nitro compounds, and more preferable are aromatic hydrocarbons and halogenated hydrocarbons. These organic solvents may be used singly or in admixture of two or more.

The amount of the organic solvent is usually so regulated that the concentration of a monomer is 0.1 to 90 wt %. Preferable proportion is 1 to 50 wt %, more preferable proportion is 2 to 30 wt %, further preferable proportion is 5 to 25 wt %.

The reaction temperature for carrying out oxidative polymerization is not particularly restricted providing it is in a range in which the reaction medium maintains liquid condition. Preferable temperature range is 0 to 200° C., more preferable range is 0 to 150° C., further preferable range is 0 to 100° C. The reaction time varies depending on reaction conditions such as reaction temperature and the like and usually 1 hour or more, preferably 2 to 500 hours.

In the present invention, in oxidative polymerization of a monomer shown by formula (1) in an organic solvent in the presence of a transition metal compound, $R^3$ may be converted into hydrogen atom.

As $R^3$ which can be converted into hydrogen atom, preferable are an alkyl group optionally substituted and a trialkylsilyl group, more preferable are an alkyl group substituted with a hydroxyl group and a trialkylsilyl group, further preferable are a 1-hydroxyalkyl group and a trialkylsilyl group, and particularly preferable are 1-hydroxy-1,1-dimethylmethyl group and trimethylsilyl group.

The method of converting $R^3$ into hydrogen atom is not particularly restricted providing $R^3$ can be converted into hydrogen atom without decomposing a polymer structure.

As the reaction of converting $R^3$ into hydrogen atom, methods described in "PROTECTIVE GROUPS in ORGANIC SYNTHESIS, 3-rd Ed." p. 654 to 659, John Wiley & Sons, Inc. can be used. Specifically, it is advantageous that alcohol such as methanol, ethanol, propanol and the like is reacted in the presence of a basic compound such as potassium carbonate, sodium carbonate, potassium hydroxide, sodium hydroxide and the like or it is reacted with a fluoride salt such as sodium fluoride, potassium fluoride, tetrabutylammonium fluoride and the like.

A polyarylene oxide thus obtained has a repeating unit shown by the following formula (2), and has a number-average molecular weight of 500 or more and a hydroxyl equivalent of 500 or more.

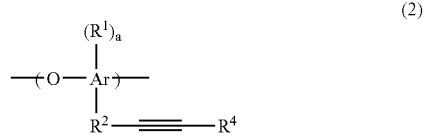

(2)

In the formula, Ar, $R^1$, $R^2$ and a have the same meanings as described above, and $R^4$ represents hydrogen atom, a hydrocarbon group optionally substituted, or a trialkylsilyl group.

The hydrocarbon group optionally substituted and trialkylsilyl group of $R^4$ have the same meanings as those, respectively, of $R^3$ in the formula (1), and the specific examples and preferred examples are also the same.

$R^4$ in formula (3) is preferably hydrogen atom, an aryl group, an alkyl group, an alkyl group substituted with a hydroxyl group, or a trialkylsilyl group, more preferably hydrogen atom, an aryl group, an alkyl group substituted with a hydroxyl group, or a trialkylsilyl group, further preferably hydrogen atom, a 1-hydroxyalkyl group, or a trialkylsilyl group, and particularly preferably hydrogen atom, 2-hydroxyisopropyl group, or trimethylsilyl group.

The polyarylene oxide may also be a copolymer having an oxyarylene unit shown by the following formula (4) in addition to repeating units shown by formula (2).

(4)

In the formula, Ar', $R^5$ and b have the same meanings as described above.

The content of an oxyarylene unit shown by formula (4) is not particularly restricted and preferably 0.001 to 1000, more preferably 0.01 to 100, further preferably 0.1 to 50 as a ratio to an oxyarylene unit shown by formula (2).

The number-average molecular weight of a polyarylene oxide obtained by the method of the present invention is 500 or more, preferably 500 to 1000000, more preferably 700 to 100000, further preferably 1000 to 50000, particularly preferably 2000 to 20000. When the number-average molecular weight is less than 500, thermo setting cannot be attained sufficiently.

The hydroxyl equivalent of a polyarylene oxide obtained by the method of the present invention is 500 or more, preferably 500 to 1000000, more preferably 600 to 100000, further preferably 800 to 50000, particularly preferably 1000 to 20000. When the hydroxyl equivalent is less than 500, thermal stability is not sufficient.

Here, the hydroxyl equivalent means weight (g) per mol of hydroxyl group.

The polyarylene oxide obtained by the method of the present invention may be used singly or used as a composition with other polymer and/or modifier.

Examples of other polymer components include polyolefins such as polyethylene, polypropylene, polystyrene, polyvinyl chloride, polymethyl methacrylate, polyvinyl acetate, polyacrylonitrile and copolymers thereof and the like; polyethers such as polyoxymethylene, polyphenylene oxide, poly(2,6-dimethyl-1,4-phenylene oxide), poly(2,5-dimethyl-1,4-phenylene oxide) and copolymers thereof and the like; polyesters such as polyethylene terephthalate, polybutylene terephthalate, poly(ethylene-2,6-dinaphthalate), poly(4-oxybenzoate), poly(2-oxy-6-naphthalate) and copolymers thereof and the like; polyamides such as nylon 6, nylon 66 and the like; polycarbonate; polyphenylene sulfide; polysulfone; polyether sulfone; polyether ether ketone; polyimide; polyether imide; thermosetting polymers such as phenol resin, urea resin, melamine resin, epoxy resin, ethynyl group-containing resin and the like. Specific examples of modifier components of a composition include stabilizers such as 2,6-di-t-butylphenol derivative, 2,2,6,6-tetramethylpiperidines and the like; flame retardants such as polyhalogenated substances, phosphate and the like; surfactants; flow modifiers and the like.

A polyarylene oxide obtained by the method of the present invention or a composition containing the polyarylene oxide can be used suitably as insulation materials for electronic parts such as semiconductors, wiring boards and the like and as paint materials for automobiles, aircrafts, rockets and the like because of excellent thermal stability and thermo setting property. It can be used also as a material for removing an unsaturated compound if the reactivity of a C≡C group is utilized.

The present invention will be described based on the following examples, but the scope of the invention should not be limited to the examples.

Monomer and catalyst: 2-(trimethylsilylethynyl)phenol (abbreviated as TMSEP) was synthesized referring to J. Org. Chem. 61, 9280, and as 2-phenylphenol (abbreviated as PhP), a commercially available product was used. $Cu(Cl)_2$ (1,4,7-triisopropyl-1,4,7-triazacyclononane) (abbreviated as Cu(tacn)) was produced according to a method described in J. Am. Chem. Soc., 120, 8529 (1998).

Number-average molecular weight (Mn), weight-average molecular weight (Mw) of polymer: Gel permeation chromatography analysis was conducted, and the weight-average molecular weight (Mw) and number-average molecular weight (Mn) were measured as a reduced value in terms of standard polystyrene. Measurement was conducted at 40° C. using 1,2-dichlorobenzene (containing 2,6-di-t-butyl-4-methylphenol 0.01% w/v) as a developing solvent using three PLgel 10 um MIXED-B manufactured by Polymer Laboratory as a column, by PL-GPC 210 system (R1 detection) manufactured by Polymer Laboratory.

Hydroxyl equivalent of polymer (HE): 100 mg of a polymer and 5 mL of 0.1 mol/L solution of acetic anhydride in pyridine were added into a flask and heated at 95-100° C. for 1 hour. To the solution, 1 mL of water was added, and only in the case that a precipetate was generated, 4 mL of pyridine was also added. After the solution was heated at 95-100° C. for 10 minutes, 5 mL of ethanol was added. The resulting solution was analyzed by potentiometric titration with 0.05 N solution of potassium hydroxide in ethanol. HE was calculated as weight (g) per mol of hydroxy group.

IR and NMR measurement of polymer: IR was measured by FT-IR MAGNA 860 manufactured by NICORAY Japan according to a KBr method. For NMR, $^1$H-NMR was measured by INOVA 300 manufactured by VARIAN in $CDCl_3$.

5% Heating loss temperature (Td5) of polymer: Temperature when weight decreased by 5% in heating from room temperature to 500° C. at a rate of 10° C./min in analysis by a differential thermobalance (TAS-200 manufactured by RIGAKU) under a nitrogen atmosphere was used as heat loss temperature (Td5).

EXAMPLE 1

On a 100 mL two-necked round-bottom flask equipped with a magnetic stirrer, a 2L rubber balloon filled with oxygen was mounted, and an atmosphere in the flask was replaced with oxygen. Into this was charged 0.58 g of Cu(tacn), and to this was added a solution prepared by dissolving 5.0 g of TMSEP and 3.4 g of 2,6-diphenylpyridine as a base in 38 g of anisole. This was kept at 60° C. and stirred vigorously. After 7.5 hours, concentrated hydrochloric acid was added to acidify the solution, then, 300 mL of methanol was added, and the precipitated polymer was filtrated off. After washing with methanol and drying under reduced pressure, a polymer was obtained. The results of analysis of this polymer are shown in Table 1.

Figure 2:
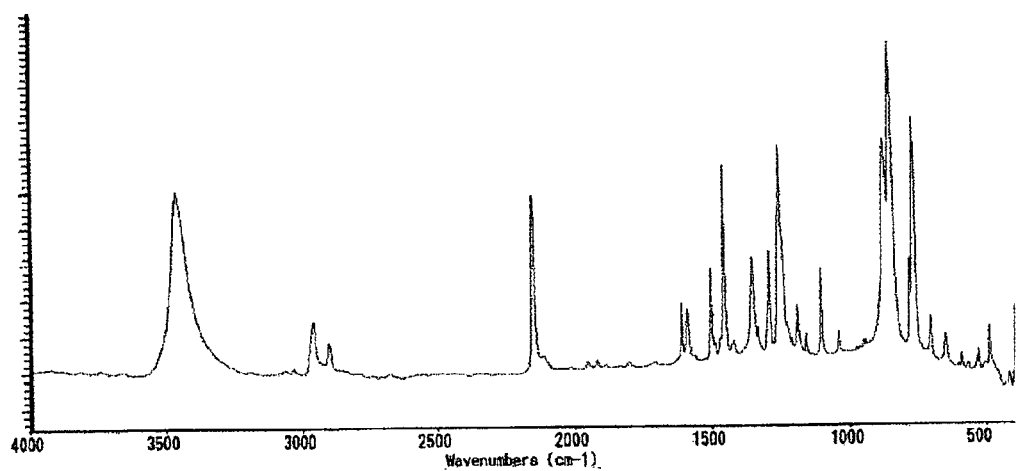
FIG. 2 is a view showing an IR chart of a monomer TMSEP used in Example 1.

IR chart of this polymer is shown in FIG. 1, and IR chart of the monomer TMSEP is shown in FIG. 2. In the IR chart of this polymer, a peak derived from C≡C stretching vibration is observed at 2160 $cm^{-1}$. Since the peak derived from O—H stretching vibration at 3500 $cm^{-1}$ of this polymer is smaller by far than that of TMSEP, it is believed that the polymer has mainly an oxyphenylene structure. By $^1$H-NMR analysis of this polymer, a peak derived from a trimethylsilyl group was observed around 0 ppm and a peak derived from a benzene ring was observed around 6.4 to 7.4 ppm. The peak area ratio of former/latter was 3, supporting that the main structure of this polymer is oxyphenylene.

EXAMPLE 2

On a 500 mL three-necked round-bottom flask equipped with a magnetic stirrer, a 2L rubber balloon filled with oxygen was mounted, and an atmosphere in the flask was replaced with oxygen. Into this was charged 1.8 g of Cu(tacn), and to this was added a solution prepared by dissolving 7.7 g of TMSEP, 15.4 g of PhP and 10.5 g of 2,6-diphenylpyridine as a base in 154 g of toluene. This was kept at 40° C. and stirred vigorously. After 71 hours, the same post treatment as described in Example 1 was performed to obtain a polymer. The results of analysis of this polymer are shown in Table 1.

In the IR analysis of this polymer, a peak derived from C≡C stretching vibration was observed at 2155 $cm^{-1}$. Since the peak derived from O—H stretching vibration at 3500 $cm^{-1}$ is smaller by far as in Example 1, it is believed that the polymer has mainly an oxyphenylene structure. By $^1$H-NMR analysis of this polymer, a peak derived from a trimethylsilyl group was observed around 0 ppm and a peak derived from a benzene ring was observed around 6.0 to 7.7 ppm. From the peak area ratio of former/latter, the ratio of oxy-(2-phenyl)phenylene unit to oxy-(2-trimethylsilylethynyl)phenylene unit was calculated to 8.3.

EXAMPLE 3

Into a 200 mL three-necked round-bottom flask equipped with a magnetic stirrer, 2.71 g of the polymer obtained in Example 1 was placed, and a 2L rubber balloon filled with argon was mounted thereon, and an atmosphere in the flask was replaced with argon. To this was added 52 mL of dehydrated tetrahydrofuran, 34 mL of dehydrated methanol and 1.21 g of potassium carbonate. This was vigorously stirred at room temperature. 27 hours after, the solution was neutralized with dilute hydrochloric acid/methanol, and concentrated. To this was added 200 mL of methanol, and the precipitated polymer was filtrated and washed. This polymer was dissolved in 60 mL of toluene, washed four times with 30 mL of 2N hydrochloric acid, and after reprecipitating, washing again, and drying under reduced pressure, a polymer was obtained. The results of analysis of this polymer are shown in Table 1.

In the IR analysis of this polymer, a peak derived from C—H stretching vibration of a terminal acetylene group was observed at 3291 cm$^{-1}$. Since the peak derived from O—H stretching vibration at 3500 cm$^{-1}$ is smaller by far as in Example 1, it is believed that the polymer has mainly an oxyphenylene structure. By $^1$H-NMR analysis of this polymer, a peak derived from a terminal acetylene group was observed around 3.1 ppm and a peak derived from a benzene ring was observed around 6.4 to 7.8 ppm. The peak area ratio of former/latter was ⅓, and a trimethylsilyethynyl group could be converted into a terminal acetylene group quantitatively.

EXAMPLE 4

Into a 500 mL three-necked round-bottom flask equipped with a magnetic stirrer, 12.5 g of the polymer obtained in Example 2 was placed, and a 2L rubber balloon filled with argon was mounted thereon, and an atmosphere in the flask was replaced with argon. To this was added 240 mL of dehydrated tetrahydrofuran, 160 mL of dehydrated methanol and 0.79 g of potassium carbonate. This was vigorously stirred at room temperature. 8 hours after, a polymer was obtained in the same manner as in Example 3. The results of analysis of this polymer are shown in Table 1.

In the chart of this polymer, a peak derived from C—H stretching vibration of a terminal acetylene was observed at 3289 cm$^{-1}$. Since the peak derived from O—H stretching vibration at 3500 cm$^{-1}$ is smaller by far as in Example 1, it is believed that the polymer has mainly an oxyphenylene structure. By $^1$H-NMR analysis of this polymer, a peak derived from a terminal acetylene group was observed around 3.1 ppm and a peak derived from a benzene ring was observed around 6.0 to 7.6 ppm. From the peak area ratio of former/latter, the ratio of oxy-(2-phenyl) phenylene unit to oxy-(2-ethynyl) phenylene unit was calculated to 8.2, and a trimethylsilylethynyl group could be converted into a terminal acetylene group quantitatively.

TABLE 1

|  | Yield (%) | Mn | Mw | HE | Td5 (° C.) |
| --- | --- | --- | --- | --- | --- |
| Example 1 | 62 | 11500 | 39600 | 2100 | 430 |
| Example 2 | 62 | 5900 | 29200 | 1900 | 489 |
| Example 3 | 71 | 3700 | 7100 | 1400 | 461 |
| Example 4 | 80 | 6600 | 26200 | 2000 | 476 |

JP-A No. 2000-63499 describes that a polyphenol having a hydroxyphenylene/oxyphenylene ratio of 40/60 and a hydroxyl equivalent of 290 obtained by oxidative polymerization of 3-ethynylphenol in a mixed solvent of organic solvent/water using an enzymatic catalyst has a Td5 of 379° C. It is guessed that when an oxyphenylene unit is contained in large amount, the initial weight loss temperature lowers since a phenolic hydroxyl group is thermally unstable.

According to the present invention, a polyarylene oxide excellent in thermal stability and a method of producing the same can be provided.

What is claimed is:

1. A method of producing a polyarylene oxide comprising oxidative polymerization of a monomer shown by formula (1) in an organic solvent in the presence of a transition metal compound,

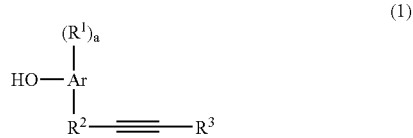

wherein, Ar represents a benzene ring or a naphthalene ring, R$^1$ represents a hydrocarbon group optionally substituted, a hydrocarbonoxy group optionally substituted, or a halogen atom; a represents an integer of 0 to 5, and when a is 2 or more, R$^1$s may be the same or different, and when two R$^1$s bond to two adjacent carbon atoms on Ar, the R$^1$s may mutually bond to form a ring; R$^2$ represents a single bond or an arylene group; R$^3$ represents a hydrocarbon group optionally substituted or a trialkylsilyl group.

2. A polyarylene oxide obtained by the production method according to claim 1.

3. The polyarylene oxide according to claim 2, containing a repeating unit shown by formula (2):

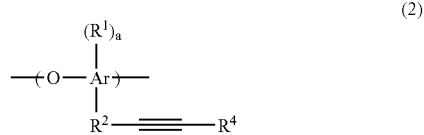

wherein, Ar, R$^1$, R$^2$ and a have the same meanings as above, and R$^4$ represents hydrogen atom, a hydrocarbon group optionally substituted, or a trialkylsilyl group, and said polyarylene oxide has a number-average molecular weight of 500 or more and a hydroxyl equivalent of 500 or more.

* * * * *